A. W. WARD.
MACHINE FOR WASHING AND DRYING DISHES.
No. 67,088. Patented July 23, 1867.
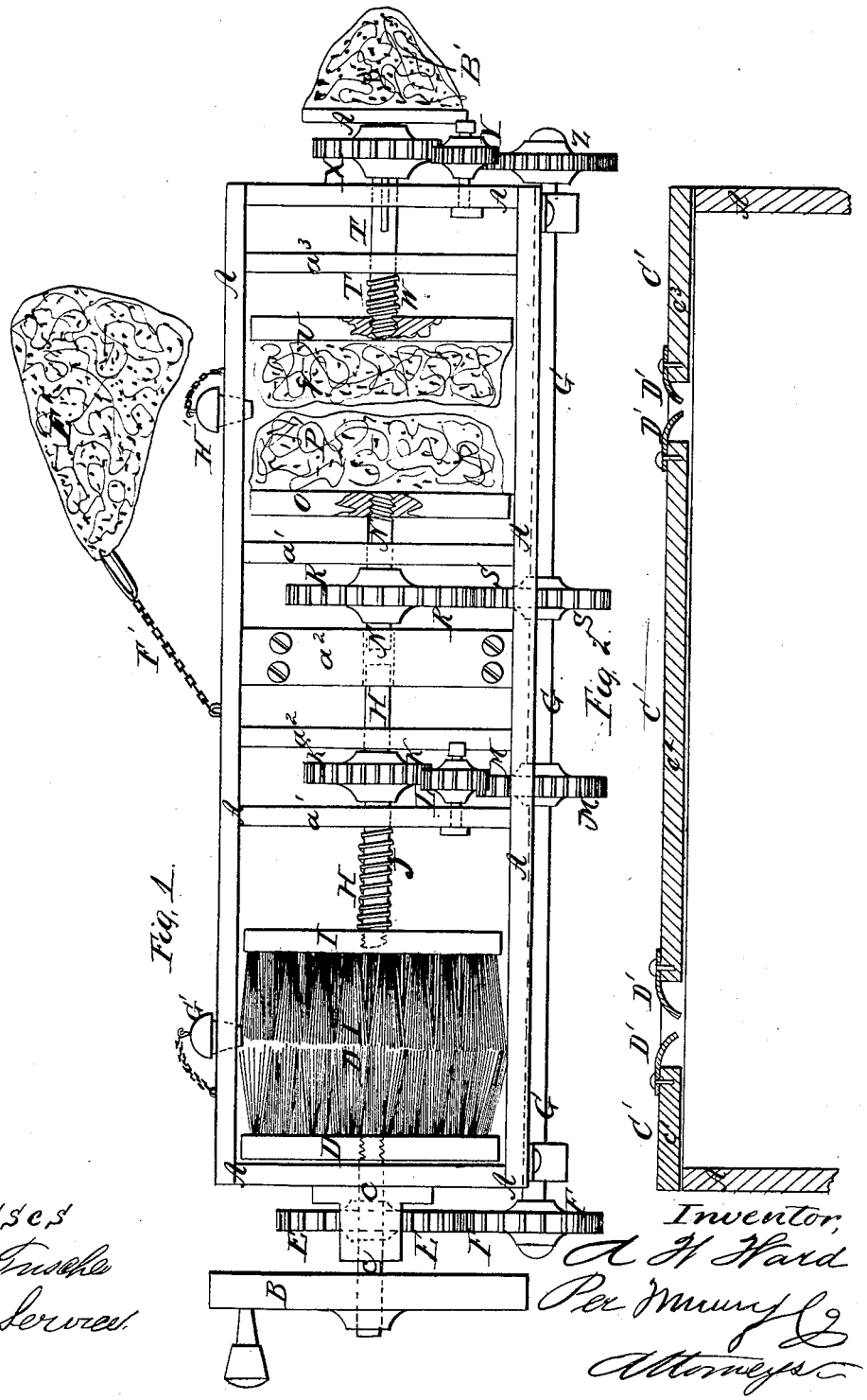
Witnesses
Theo Tusche
J. A. Servies
Inventor
A. W. Ward
Per Munn & Co
Attorneys

United States Patent Office.

A. W. WARD, OF FISHKILL, NEW YORK.

Letters Patent No. 67,088, dated July 23, 1867.

---

IMPROVED MACHINE FOR WASHING AND DRYING DISHES.

---

*The Schedule referred to in these Letters Patent and making part of the same.*

---

TO ALL WHOM IT MAY CONCERN:

Be it known that I, A. W. WARD, of Fishkill, Dutchess county, New York, have invented a new and improved Machine for Washing and Drying Dishes; and I do hereby declare that the following is a full, clear, and exact description thereof, which will enable others skilled in the art to make and use the same, reference being had to the accompanying drawings forming part of this specification, in which—

Figure 1 is a top or plan view of my improved machine, the cover being removed.

Figure 2 is a detail sectional view of the upper part of the box, showing the position of the cover.

Similar letters of reference indicate corresponding parts.

My invention has for its object to furnish an improved machine by means of which dishes may be washed and dried quickly, thoroughly, and conveniently; and it consists in the combination of two brushes revolving in opposite directions, with the shafts to which they are removably attached, with the box in which they work, and with the gearing by which they are driven; in the combination of two sponges and disks, revolving in opposite directions with each other, with the shafts to which they are removably attached, with the box in which they work, and with the gearing by which they are driven.

A is the box of the machine, which is made of sufficient size in its cross-section to receive the dishes for washing which the machine is intended, and which is divided into water-tight compartments by the partitions $a'$. B is the crank-wheel, by means of which the machine is operated, and which is made heavy, so as to act as a balance-wheel. The wheel B is attached to the end of the shaft C, which passes in through the end of the box A, and has a brush, D, screwed upon or otherwise removably attached to its inner end. To the shaft C, between the end of the box A and the crank-wheel B, is attached a gear-wheel, E, the teeth of which mesh into the teeth of the gear-wheel F, attached to the shaft G, which revolves in bearings attached to the side of the box A. H is a shaft, which revolves in bearings in the partition $a^1$, and in the cross-timbers $a^2$, and upon the end of which is screwed or otherwise removably attached a brush, I. The shaft H is so arranged in its bearings that it may be moved back longitudinally to remove the brush I from the brush D when required. The brush I is held forward in proper working position, with reference to the brush D, by a coiled wire spring, J, the forward end of which rests against the brush I, and the rear end against the partition $a^1$; or the same thing may be accomplished by any other equivalent device. K is a gear-wheel, attached to the shaft H, the teeth of which mesh into the teeth of the gear-wheel L, pivoted to the partition $a^1$ and cross-timber $a^2$, and into the teeth of which mesh the teeth of the gear-wheel M, attached to the shaft G. By this arrangement the brushes D and I will be made to revolve in opposite directions. N is a shaft, revolving in bearings in the cross-timbers $a^2$ and partitions $a^1$, and upon the forward end of which is screwed or otherwise removably attached a disk, $o$, having a sponge, P, secured to its face, as shown in fig. 1. R is a gear-wheel, attached to the shaft N, the teeth of which mesh into the teeth of the gear-wheel S, attached to the shaft G. T is a shaft, revolving in bearings in the cross-timber $a^3$, and end of the box A. Upon the forward end of the shaft T is screwed or otherwise removably attached a disk, U, having a sponge, V, attached to its face. The shaft T is so arranged that it may be moved longitudinally through its bearings to move the sponges apart when desired, and it is held forward in proper working position with respect to the sponge P by a coiled spring, W, or some equivalent device. X is a gear-wheel, attached to the projecting part of the shaft T at the end of the box A, the teeth of which mesh into the teeth of the gear-wheel Y, pivoted to the end of the box A, and into the teeth of which also mesh the teeth of the gear-wheel Z, attached to the shaft G, so that the disk U and sponge V may be revolved in the opposite direction from the disk O and sponge P. A' is a disk, attached to the end of the shaft T, and having a sponge, P', attached to its face. This device is designed to be used for drying goblets, tumblers, and similar dishes that cannot be inserted between the sponges P and V. C' is the cover, which is made in three parts, $c^1 \, c^2 \, c^3$, and slides in grooves in the upper parts of the sides of the box A, the openings between the parts being directly over the points where the brushes and sponges meet, so that the dishes may be introduced through the said openings. D' are rubber flaps, attached to the ends of the parts of the cover upon each side of the said openings to prevent the water from spattering out during the operation. E' is a flat piece of sponge, which when the sponges P and V become too wet may be introduced between them to absorb and remove the moisture. The sponge E' may be secured to the box A by a chain, F', or other flexible connection. G' is a plug, closing an opening into the brush compartment of the box A, through which the water may be drawn off when required; and H' is a plug, closing an opening into the sponge compartment of the box A, through which any water that may collect therein may be drawn off.

Having thus described my invention, what I claim as new, and desire to secure by Letters Patent, is—

1. The combination of the two brushes, D and I, revolving in opposite directions with the shafts C and H, to which they are removably attached, with the box A and gearing by which they are operated, substantially as herein shown and described and for the purpose set forth.

2. The combination of the sponges P and V, and disks O and U, revolving in different directions with each other, with the box A, and with the gearing by which they are operated, substantially as herein shown and described and for the purpose set forth.

A. W. WARD.

Witnesses:
FRANK H. HANSON,
JAMES E. MEMBER.